United States Patent
Kichimi et al.

[11] Patent Number: 6,060,827
[45] Date of Patent: May 9, 2000

[54] BACKLIGHT AND PLASMA ADDRESSED ELECTRO-OPTICAL DISPLAY

[75] Inventors: Tomoaki Kichimi; Koichi Yamamoto, both of Kanagawa, Japan

[73] Assignee: Sony Corporation, Tokyo, Japan

[21] Appl. No.: 08/987,200

[22] Filed: Dec. 9, 1997

[30] Foreign Application Priority Data

Dec. 9, 1996 [JP] Japan ................................ P08-328905

[51] Int. Cl.⁷ ....................................................... H01J 61/00
[52] U.S. Cl. ............................ 313/582; 313/584; 313/586; 345/60
[58] Field of Search ..................................... 313/582, 583, 313/584, 585, 586, 587; 345/60, 84, 87, 90, 204; 349/32, 122, 138

[56] References Cited

U.S. PATENT DOCUMENTS

| | | | |
|---|---|---|---|
| 5,754,003 | 5/1998 | Murai et al. ................................ | 313/582 |
| 5,808,410 | 9/1998 | Pinker et al. ............................. | 313/493 |
| 5,909,261 | 6/1999 | Seki et al. ................................. | 313/583 |

*Primary Examiner*—Vip Patel
*Assistant Examiner*—Joseph Williams
*Attorney, Agent, or Firm*—Hill & Simpson

[57] ABSTRACT

A plasma addressed electro-optical display with a high contrast, having a first substrate having a plurality of discharge electrodes formed thereon; a dielectric layer disposed apart from the first substrate by a predetermined distance; a plasma cell formed by sealing the peripheries of the first substrate and the dielectric layer with a sealing portion; and a second substrate disposed opposite to the dielectric layer and having data electrodes intersecting the discharge electrodes on the surface thereof, wherein the plasma cell and the second substrate are stacked in such a manner that an electro-optical material layer is interposed between the plasma cell and the second substrate so that the plasma addressed electro-optical display is formed, and a light source is disposed adjacent to the second substrate.

7 Claims, 5 Drawing Sheets

BACKLIGHT AND PLASMA ADDRESSED ELECTRO-OPTICAL DISPLAY

BACKGROUND OF THE INVENTION

1. Field of the Invention

The present invention relates to an image display (a so-called plasma addressed electro-optical display) using plasma to activate an electro-optical material layer so as to display an image.

2. Description of Prior Art

The resolution and contrast of a liquid-crystal type display unit have been improved by, for example, a so-called active matrix addressing method, in which an active device, such as a transistor, is provided for each display pixel and the active devices are operated.

The foregoing method, however, must use a multiplicity of semiconductor devices, such as thin-film transistors, thus causing a problem of unsatisfactory low manufacturing yield to arise when a display having a large area is manufactured. Thus, there arises a problem in that the cost cannot be reduced.

To solve the foregoing problem, a method has been suggested which employs discharge plasma active devices in place of the semiconductor devices, such as MOS transistors and thin-film transistors.

An image display apparatus (hereinafter called a "plasma addressed electro-optical display") has a stacked structure composed of a liquid crystal layer, which is an electro-optical material layer, and a plasma cell, in which plasma discharge takes place. A thin and dielectric-material plate made of glass the like is disposed between the liquid crystal layer or the plasma cell.

The plasma addressed electro-optical display has a structure that the plasma cell is divided into linear plasma chambers by barrier ribs. The plasma chambers are sequentially switched and scanned, and signal voltages are synchronously applied to transparent electrodes opposite to the plasma chambers in such a manner that the liquid crystal layer is interposed. Thus, the liquid crystal layer is operated.

The plasma addressed electro-optical display is generally arranged in such a manner that a backlight is disposed behind the plasma cell. Light beams emitted from the backlight are allowed to pass through the substrate having the plasma cell, the liquid crystal layer and a color filter. Thus, an image is visibly recognized from a position through the substrate having the color filter.

The above-mentioned structure, however, suffers from reduction in the contrast because liquid crystal portions (hereinafter called "low contrast portions"), which have not been satisfactorily oriented into a predetermined direction, are undesirably included in the field of view.

OBJECT AND SUMMARY OF THE INVENTION

Accordingly, an object of the present invention is to provide a plasma addressed electro-optical display which is capable of raising the contrast thereof so that the problems experienced with the conventional structure are solved.

To achieve the above-mentioned and other objects, according to one aspect of the present invention, there is provided a plasma addressed electro-optical display including a first substrate having a plurality of discharge electrodes formed thereon; a dielectric layer disposed apart from the first substrate by a predetermined distance; a plasma cell formed by sealing the peripheries of the first substrate and the dielectric layer with a sealing portion; and a second substrate disposed opposite to the dielectric layer and having data electrodes intersecting the discharge electrodes on the surface thereof, wherein the plasma cell and the second substrate are stacked in such a manner that an electro-optical material layer is interposed between the plasma cell and the second substrate so that the plasma addressed electro-optical display is formed, and a light source is disposed adjacent to the second substrate.

The plasma addressed electro-optical display according to the present invention may have a structure that color filters are formed on the second substrate, and black stripes are formed between the color filters.

The plasma addressed electro-optical display according to the present invention may have a structure that the color filters are formed into stripe configurations, and the color filters and the black stripes intersect the discharge electrodes at right angles.

The plasma addressed electro-optical display according to the present invention may have a structure that the first and second substrates are glass substrates, and the electro-optical material is liquid crystal.

The plasma addressed electro-optical display according to the present invention may have a structure that the discharge electrodes are made of a light shielding material, and the data electrodes are made of a transparent material.

The plasma addressed electro-optical display according to the present invention may have a structure that voltage is applied to each of the data electrodes, and the data voltage is applied to the electro-optical layer corresponding to pixels positioned at intersections of the data electrodes and the discharge electrodes.

In the plasma addressed electro-optical display, it is ideal that the voltage the (drive voltage) applied to the liquid crystal by the discharge between the discharge electrodes is uniform from the anode electrode A up to the cathode electrode K as shown in FIG. 1A.

Actually, however, as shown in FIG. 1B, the drive voltage is lowered in the vicinity of the anode electrode A and the cathode electrode K, for which portions the liquid crystal material of the liquid crystal layer is not driven or (oriented) sufficiently, resulting in a low contrast.

In the conventional plasma addressed electro-optical display (i.e., plasma addressed electro-optical display in which the aforementioned second substrate is arranged on the display screen to be viewed from this side), this low contrast portion come directly into the field of view, which in turn decreases the contrast of the entire screen.

On the contrary, when viewed from the side of the first substrate according to the present invention, the aforementioned low contrast portion is shaded by the discharge electrodes and will almost not come into the field of view, resulting in a significant improvement in the contrast of the entire screen.

Other objects, features and advantages of the invention will be evident from the following detailed description of the preferred embodiments described in conjunction with the attached drawings.

DETAILED DESCRIPTION OF THE INVENTION

An embodiment of the present invention will now be described with reference to the drawings.

Figure 1A:
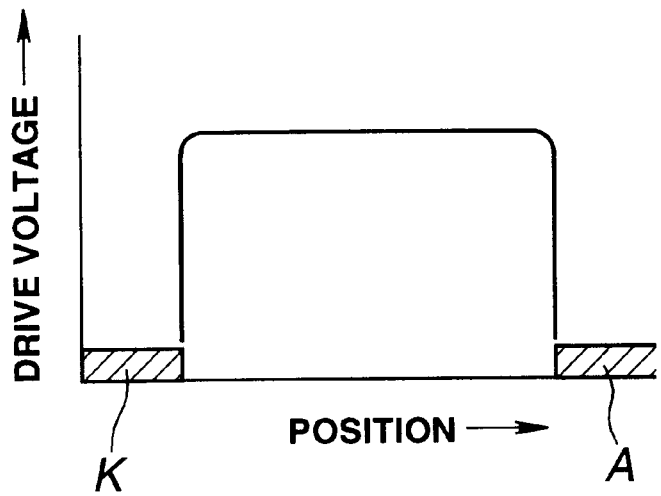
FIG. 1 is a graph showing a distribution of drive voltages among discharge electrodes.
Figure 1B:
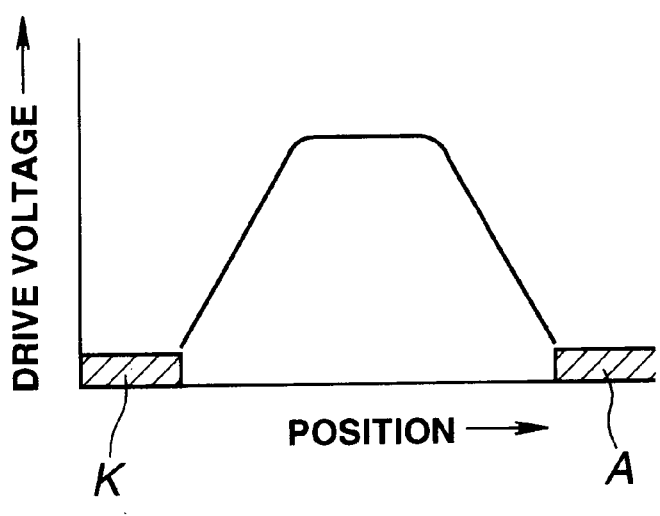
Figure 2:
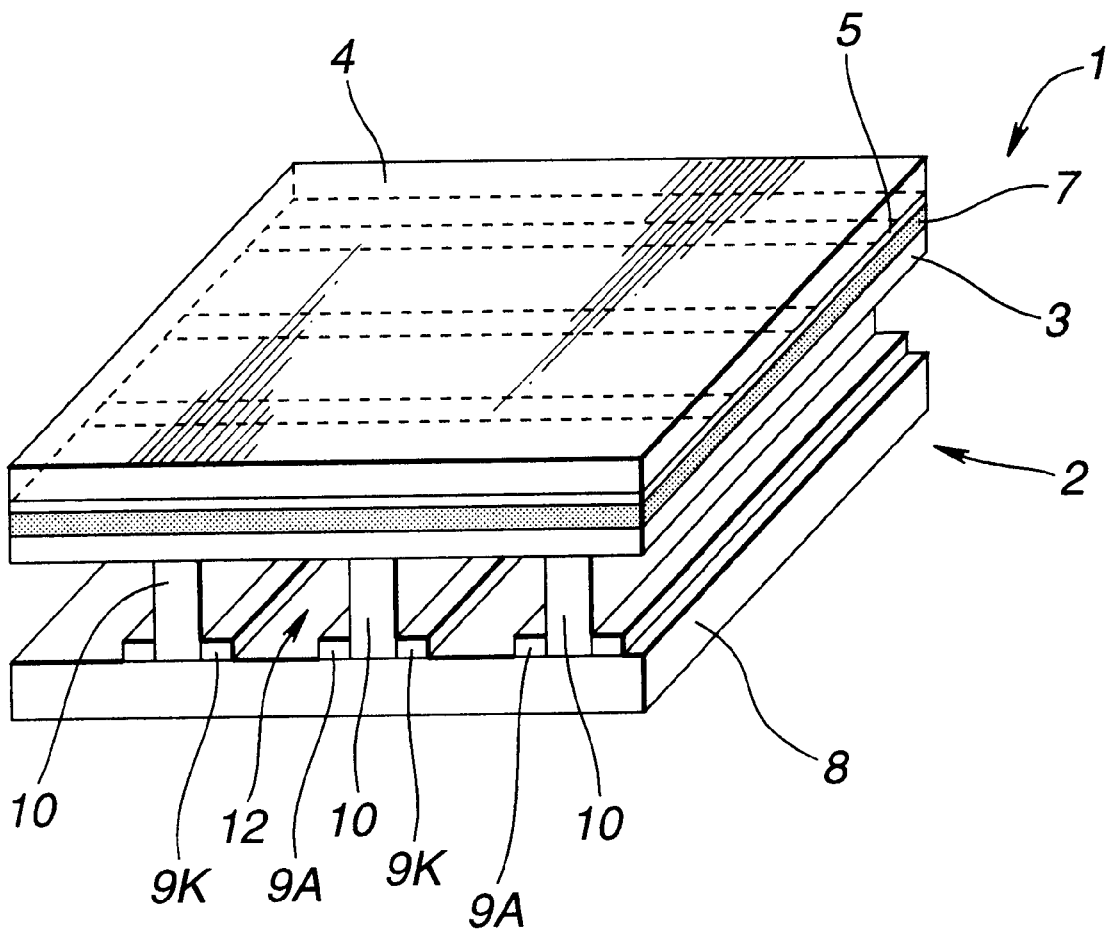
FIG. 2 is a partially-cut schematic and perspective view showing the structure of a plasma addressed electro-optical display according to an embodiment of the present invention.
Figure 3:
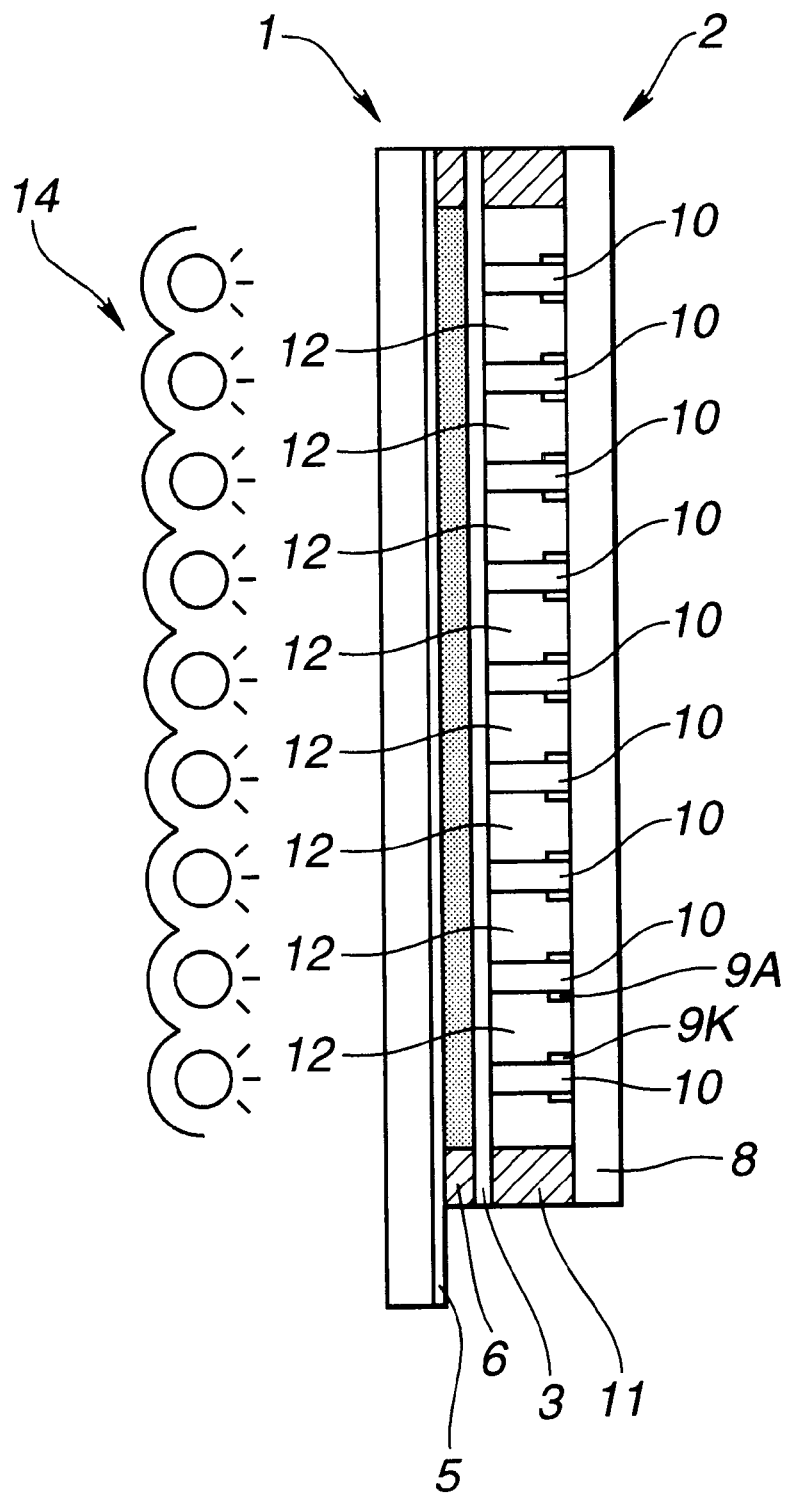
FIG. 3 is a schematic cross sectional view showing the structure of the plasma addressed electro-optical display according to the present invention.

A plasma addressed electro-optical display according to this embodiment has a so-called flat panel structure. The structure is formed into a stacked shape composed of an electro-optical display cell 1, a plasma cell 2 and a dielectric sheet 3, which is interposed between the electro-optical display cell 1 and the plasma cell 2, as shown in FIGS. 2 and 3.

The dielectric sheet 3 is formed by a thin glass plate or the like to serve as a capacitor. Therefore, it is preferable that the thickness of the dielectric sheet 3 is minimized to realize satisfactory electrical coupling between the electro-optical display cell 1 and the plasma cell 2 and to prevent two-dimensional expansion of electrical charges. Specifically, a thin glass plate having a thickness of about 50 $\mu$m is employed.

The electro-optical display cell 1 is manufactured in such a manner that a glass substrate (an upper substrate) 4 having a predetermined distance from the dielectric sheet 3 by virtue of a spacer 6, is joined to the upper surface of the dielectric sheet 3.

A liquid crystal material, which is an electro-optical material, is enclosed in a space between the dielectric sheet 3 and the upper substrate 4. Thus, a liquid crystal layer 7 is formed. Note that the electro-optical material may be a material other than liquid crystal.

The distance from the upper substrate 4 to the dielectric sheet 3 is determined to be, for example, 4 $\mu$m to 10 $\mu$m, which is maintained substantially uniformly over the display surface.

A plurality of data electrodes 5 made of a transparent conductive material and extending, for example, in a direction of the rows, are disposed on the surface of the upper substrate 4 opposite to the dielectric sheet 3. The data electrodes 5 are, at predetermined intervals, formed in parallel with each other in a direction of columns.

Moreover, a color filter is provided for the upper substrate 4 so that full-color display is enabled. The foregoing color filter has black stripes in a direction perpendicular to a direction of the discharge electrodes to be described later. Thus, pixels are sectioned.

The plasma cell 2 is composed of the dielectric sheet 3 and a glass substrate (a lower substrate) 8 disposed below the dielectric sheet 3.

A plurality of anode electrodes 9A and cathode electrodes 9K extending in a direction perpendicular to the direction of the data electrodes 5, that is, in the direction of the columns are disposed on the surface of the lower substrate 8 opposite to the dielectric sheet 3. The anode electrodes 9A and cathode electrodes 9K are formed in parallel with each other and apart from each other for a predetermined distance to form a discharge electrode group.

Moreover, barrier ribs 10 each having a predetermined width and extending along the anode electrodes 9A and the cathode electrodes 9K are formed between the adjacent anode electrodes 9A and the cathode electrodes 9K. The top end of each of the barrier ribs 10 is in contact with the lower surface of the dielectric sheet 3 so that a substantially constant distance is maintained from the lower substrate 8 to the dielectric sheet 3.

The dielectric sheet 3 is hermetically joined to the lower substrate 8 at an outer periphery thereof by a frit seal 11 formed by low melting point glass or the like. Thus, the plasma cell 2 is formed into a hermetically sealed space. The hermetically sealed space is filled with a gas that is capable of being ionized, for example, helium gas, neon gas, argon gas or their mixture gases.

The plasma addressed electro-optical display according to this embodiment has a plurality of discharge channels (spaces) 12 formed between the lower substrate 8 and the dielectric sheet 3 and separated from one another by the barrier ribs 10. The discharge channels 12 are formed in parallel with one another in the direction of the rows. The discharge channels 12 intersect the data electrodes 5 at right angles.

Figure 4:
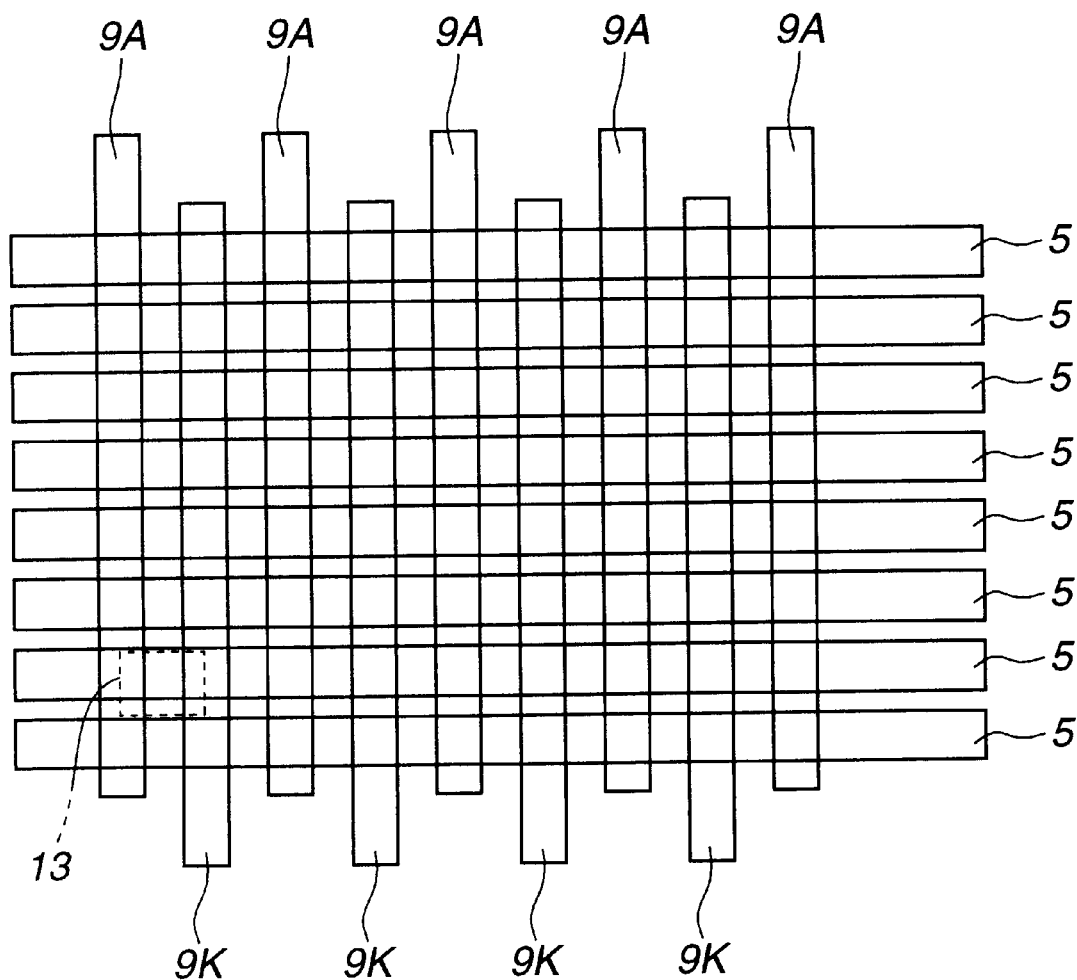
FIG. 4 is a schematic view showing a configuration of the data electrodes, discharge electrodes and discharge channels.

Therefore, each of the data electrodes 5 serves as a unit for operating a column, while each of the discharge channels 12 serves as a unit for operating a row. As shown in FIG. 4, intersections of the data electrodes 5 and the discharge channels 12 correspond to pixels 13.

In the plasma addressed electro-optical display having the above-mentioned structure, when a drive voltage is applied between the anode electrodes 9A and cathode electrodes 9K corresponding to predetermined discharge channels 12, the gas enclosed in the discharge channels 12 is ionized. Thus, plasma discharge takes place and the potentials in the discharge channels 12 are brought to the anode potential.

When the data voltage is applied to each of the data electrodes 5 in the foregoing state, the data voltage is written on the liquid crystal layer 7 corresponding to the plural pixels 13 disposed in the direction of the columns to correspond to the discharge channels 12 in which the plasma discharge has taken place.

After the plasma discharge has been completed, the potentials of the discharge channels 12 are permitted to float. Thus, the data voltage written on the liquid crystal layer 7 corresponding to the pixels 13 is maintained to a next writing period (for example, one field or one frame after). In this case, the discharge channels 12 serve as sampling switches and the liquid crystal layer 7 of each of the pixels 13 serves as a sampling capacitor.

The liquid crystal material is operated with the data voltage written on the liquid crystal layer 7 so that a display is performed at each pixel 13. Therefore, the liquid crystal layer 7 is operated similarly to the active matrix addressing method when the discharge channels 12 which generate plasma discharge are sequentially scanned and the data voltage is applied to each of the data electrodes 5 in synchronization with the scanning operations. Thus, a two-dimensional display can be performed.

The plasma addressed electro-optical display has the above-mentioned basic structure. As shown in FIG. 3, the plasma addressed electro-optical display according to this embodiment has a backlight 14 disposed behind the upper substrate 4. Thus, the displayed image is visually recognized from a position through the lower substrate 8. That is, the glass substrate 8 serves as the display surface.

The foregoing structure is contrary to the conventional structure.

As described above, the drive voltage which is applied to the liquid crystal layer between the anode electrodes 9A and cathode electrodes 9K serving as the discharge electrodes is not constant in the plasma addressed electro-optical display. As a result, liquid crystal layer portions (low contrast portions) each having unsatisfactorily low drive voltage levels exist adjacent to the discharge electrodes or below the barrier ribs 10.

Also the plasma addressed electro-optical display according to this embodiment has a similar problem. However, the plasma addressed electro-optical display according to this embodiment has the structure in which the upper substrate 4 having the color filter is disposed adjacent to a light source and the glass substrate 8 forming the plasma cell 2 is disposed adjacent to the display surface. Thus, the adverse influence of the low contrast portion can be prevented, thus causing the contrast to be raised.

Figure 5:
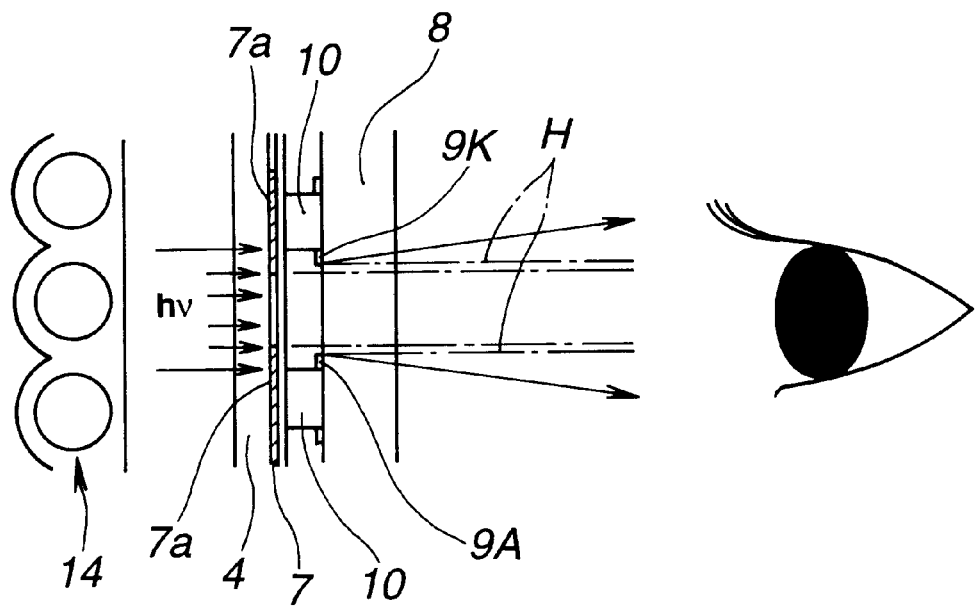
FIG. 5 is a schematic view showing a state of the transmitted light beams in the plasma addressed electro-optical display according to the present invention.

The thus-realized state is shown in FIG. 5. A user watches an image from a right-hand position in FIG. 5.

At this time, the liquid crystal layer 7 has low contrast portions 7a adjacent to the anode electrodes 9A and 9K and below the barrier ribs 10, as indicated by diagonal lines shown in FIG. 5.

However, light beams H of the total light beams hv emitted from the backlight 14 which is the light source that have allowed to pass through the low contrast portions 7a are shielded by the anode electrodes 9A or the cathode electrodes 9K. As a result, the light beams H cannot reach the eyes of the user. Although slight white regions (or dark regions) exist, their levels can be restrained to an inconspicuous level.

If the direction of the panel is inverted and the image is caused to be watched from a portion through the upper substrate 4, the light beams H which are allowed to pass through the low contrast portions 7a reach the eyes of the user without interruption. Therefore, a great portion of the white regions (or dark regions) is included in the field of view. As a result, reduction in the contrast takes place.

Figure 6:
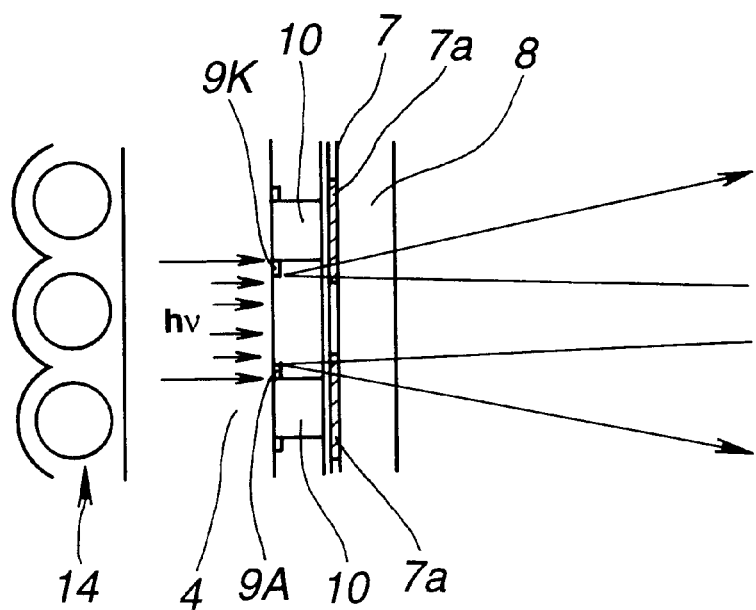
FIG. 6 is a schematic view showing a state of the transmitted light beams in a conventional plasma addressed electro-optical display.

Experiments were performed by using a plasma addressed electro-optical display having a structure that the pitch of the discharge electrodes was about 200 $\mu$m to about 300 $\mu$m, the height of each barrier rib was some hundreds of $\mu$m and the thickness of the liquid crystal layer 7 was several $\mu$m. The contrast realized when an image was watched from a direction shown in FIG. 5 and those realized when an image were watched from a direction shown in FIG. 6 were subjected to comparisons. A result is that the plasma addressed electro-optical display (see FIG. 5) according to the present invention had high contrasts which were 1.5 times to 1.8 times those realized with the conventional structure.

Although the invention has been described in its preferred form with a certain degree of particularity, it is understood that the present disclosure of the preferred form can be changed in the details of construction and in the combination and arrangement of parts without departing from the spirit and the scope of the invention as hereinafter claimed.

What is claimed is:

1. A plasma addressed electro-optical display, comprising:
    a first substrate having a plurality of discharge electrodes formed thereon;
    a dielectric layer disposed apart from said first substrate by a predetermined distance;
    a plasma cell formed by sealing peripheries of said first substrate and said dielectric layer with a sealing portion; and
    a second substrate disposed opposite to said dielectric layer and having data electrodes intersecting said discharge electrodes, said data electrodes being a surface
    an electro-optical material layer interposed between said plasma cell and said second substrate so that said plasma addressed electro-optical display is formed, and
    a light source is disposed adjacent to said second substrate and operable to transmit a light first through said second substrate then through said electro-optical material then through said dielectric layer then through said plasma cell for viewing by a viewer.

2. A plasma addressed electro-optical display according to claim 1, further comprising:
    color filters on said second substrate, and black stripes between said color filters.

3. A plasma addressed electro-optical display according to claim 2, wherein
    said color filters are formed into stripe configurations, and said color filters and said black stripes intersect said discharge electrodes at right angles.

4. A plasma addressed electro-optical display according to claim 1, wherein
    said first and second substrates are glass substrates, and said electro-optical material is liquid crystal.

5. A plasma addressed electro-optical display according to claim 1, wherein
    said discharge electrodes are of a light shielding material, and said data electrodes are of a transparent material.

6. A plasma addressed electro-optical display according to claim 1, wherein
    voltage is applied to each of said data electrodes, and data voltage is applied to said electro-optical layer corresponding to pixels positioned at intersections of said data electrodes and said discharge electrodes.

7. A method of operating a plasma addressed liquid crystal display, comprising the steps of:
    applying a discharge voltage between discharge electrode in a discharge chamber of a discharge layer;
    applying a data voltage to a data electrode in an electro-optical material layer disposed adjacent the discharge layer;
    transmitting alight through the electro-optical material layer before transmitting the light through the discharge layer to illuminate a pixel of the display.

* * * * *